United States Patent
Mannemala et al.

(10) Patent No.: US 10,187,824 B2
(45) Date of Patent: Jan. 22, 2019

(54) DEVICE AND METHOD FOR RELIABLE WIFI DATA CONNECTIVITY

(71) Applicant: APPLE INC., Cupertino, CA (US)

(72) Inventors: Chaitanya Mannemala, Fremont, CA (US); Kapil Chhabra, Cupertino, CA (US)

(73) Assignee: APPLE INC., Cupertino, CA (US)

(*) Notice: Subject to any disclaimer, the term of this patent is extended or adjusted under 35 U.S.C. 154(b) by 172 days.

(21) Appl. No.: 14/726,121

(22) Filed: May 29, 2015

(65) Prior Publication Data

US 2015/0350957 A1 Dec. 3, 2015

Related U.S. Application Data

(60) Provisional application No. 62/005,960, filed on May 30, 2014.

(51) Int. Cl.
- *H04W 28/22* (2009.01)
- *H04L 1/00* (2006.01)
- *H04L 12/26* (2006.01)

(52) U.S. Cl.
CPC ........... *H04W 28/22* (2013.01); *H04L 1/0002* (2013.01); *H04L 43/0847* (2013.01)

(58) Field of Classification Search
CPC ... H04W 28/22; H04L 43/0847; H04L 1/0002
See application file for complete search history.

(56) References Cited

U.S. PATENT DOCUMENTS

| | | | | |
|---|---|---|---|---|
| 5,450,438 A | * | 9/1995 | Landry | H04L 1/20 375/222 |
| 2005/0027890 A1 | * | 2/2005 | Nelson | G06F 3/023 709/250 |
| 2006/0126514 A1 | * | 6/2006 | Lee | H04L 43/0811 370/238 |
| 2010/0034106 A1 | * | 2/2010 | Hu | H04L 43/0882 370/252 |
| 2015/0200870 A1 | * | 7/2015 | Hui | H04L 47/22 709/226 |
| 2016/0127947 A1 | * | 5/2016 | Bhanage | H04W 74/002 370/328 |

* cited by examiner

*Primary Examiner* — Hassan Kizou
*Assistant Examiner* — Abdullahi Ahmed
(74) *Attorney, Agent, or Firm* — Fay Kaplun & Marcin, LLP (57) ABSTRACT

A station and non-transitory computer readable storage medium for determining a first physical layer rate to perform data transmissions between the station and an access point of a WiFi network, the first physical layer rate being based on a primary rate and a plurality of fallback rates associated with the access point, the primary rate having a higher transmission speed than the plurality of fallback rates, determining a trigger based upon at least one current condition of the station and at least one corresponding prior condition existing at a time when the first physical layer rate is determined, selecting one of the plurality of fallback rates when the trigger is determined, performing data transmissions between the station and the access point using the one of the plurality of fallback rates and determining a second physical layer rate based on the one of the plurality of fallback rates.

20 Claims, 4 Drawing Sheets

DEVICE AND METHOD FOR RELIABLE
WIFI DATA CONNECTIVITY

PRIORITY CLAIM/INCORPORATION BY
REFERENCE

This application claims priority to U.S. Provisional Application 62/005,960 entitled "Device and Method for Reliable WiFi Data Connectivity," filed on May 30, 2014, the entirety of which is incorporated herein by reference.

BACKGROUND INFORMATION

A station may establish a connection to a communications network to perform a variety of different functionalities. The communications network may be a WiFi network that operates under standards as defined by the Institute of Electrical and Electronics Engineers (IEEE) such as 802.11a/b/g/n/ac. The station may initially associate with an access point of the WiFi network to join a Basic Service Set (BSS) of the WiFi network. Once the station joins the WiFi network, the station may communicate with other stations connected to the WiFi network, other network components, and/or other networks (e.g., Internet).

The data connectivity connection between the station and the WiFi network may utilize a physical layer rate that is a transmission speed for incoming data for the station. There is generally a trade off between using different (e.g., higher or lower) physical layer rates. A higher physical layer rate may enable data to be exchanged in a relatively faster manner compared to a lower physical layer rate. However, a lower physical layer rate may be more robust since the slower transmission speed may ensure that the incoming data is properly received. Whereas, a higher physical layer rate may pose a higher risk of data loss. Typically, there is a preference for higher physical layer rates. Therefore, the WiFi network may initially attempt to use these higher physical layer rates even when the station is incapable of supporting this rate under current network conditions being experienced by the station.

SUMMARY

A method performed by a station. The method includes determining a first physical layer rate to perform data transmissions between the station and an access point of a WiFi network, the first physical layer rate being based on a primary rate and a plurality of fallback rates associated with the access point, the primary rate having a higher transmission speed than the plurality of fallback rates, determining a trigger based upon at least one current condition of the station and at least one corresponding prior condition existing at a time when the first physical layer rate is determined, selecting one of the plurality of fallback rates when the trigger is determined, performing data transmissions between the station and the access point using the one of the plurality of fallback rates and determining a second physical layer rate based on the one of the plurality of fallback rates.

A station having a transceiver configured to establish a connection to a network and a processor. The processor and transceiver are configured to determine a physical layer rate to be used with an access point of the network by determining a first physical layer rate to perform data transmissions between the station and an access point of a WiFi network, the first physical layer rate being based on a primary rate and a plurality of fallback rates associated with the access point, the primary rate having a higher transmission speed than the plurality of fallback rates, determining a trigger based upon at least one current condition of the station and at least one corresponding prior condition existing at a time when the first physical layer rate is determined, selecting one of the plurality of fallback rates when the trigger is determined, performing data transmissions between the station and the access point using the one of the plurality of fallback rates and determining a second physical layer rate based on the one of the plurality of fallback rates.

A non-transitory computer readable storage medium with an executable program stored thereon, wherein the program instructs a microprocessor to perform operations. The operations including determining a first physical layer rate to perform data transmissions between a station and an access point of a network, the first physical layer rate being based on a primary rate and a plurality of fallback rates associated with the access point, the primary rate having a higher transmission speed than the plurality of fallback rates, determining a trigger based upon at least one current condition of the station and at least one corresponding prior condition existing at a time when the first physical layer rate is determined, selecting one of the plurality of fallback rates when the trigger is determined, performing data transmissions between the station and the access point using the one of the plurality of fallback rates and determining a second physical layer rate based on the one of the plurality of fallback rates.

DETAILED DESCRIPTION

The exemplary embodiments may be further understood with reference to the following description and the related appended drawings, wherein like elements are provided with the same reference numerals. The exemplary embodiments are related to a station and method for providing a reliable WiFi data connectivity between the station and a WiFi network. Specifically, the station may be connected to the WiFi network in which a converged physical layer rate has been determined. A "converged" physical layer rate may be considered a physical layer rate that has been selected by the station based on a convergence process. An exemplary convergence process will be described in greater detail below. During the course of being connected to the WiFi network, the station may experience a change in network conditions such that the converged physical layer rate may not provide a reliable connection to the WiFi network. In the exemplary embodiments, the reliable WiFi data connectivity may be achieved using a robust fallback rate of the WiFi network when this change in network conditions occurs.

Figure 1:
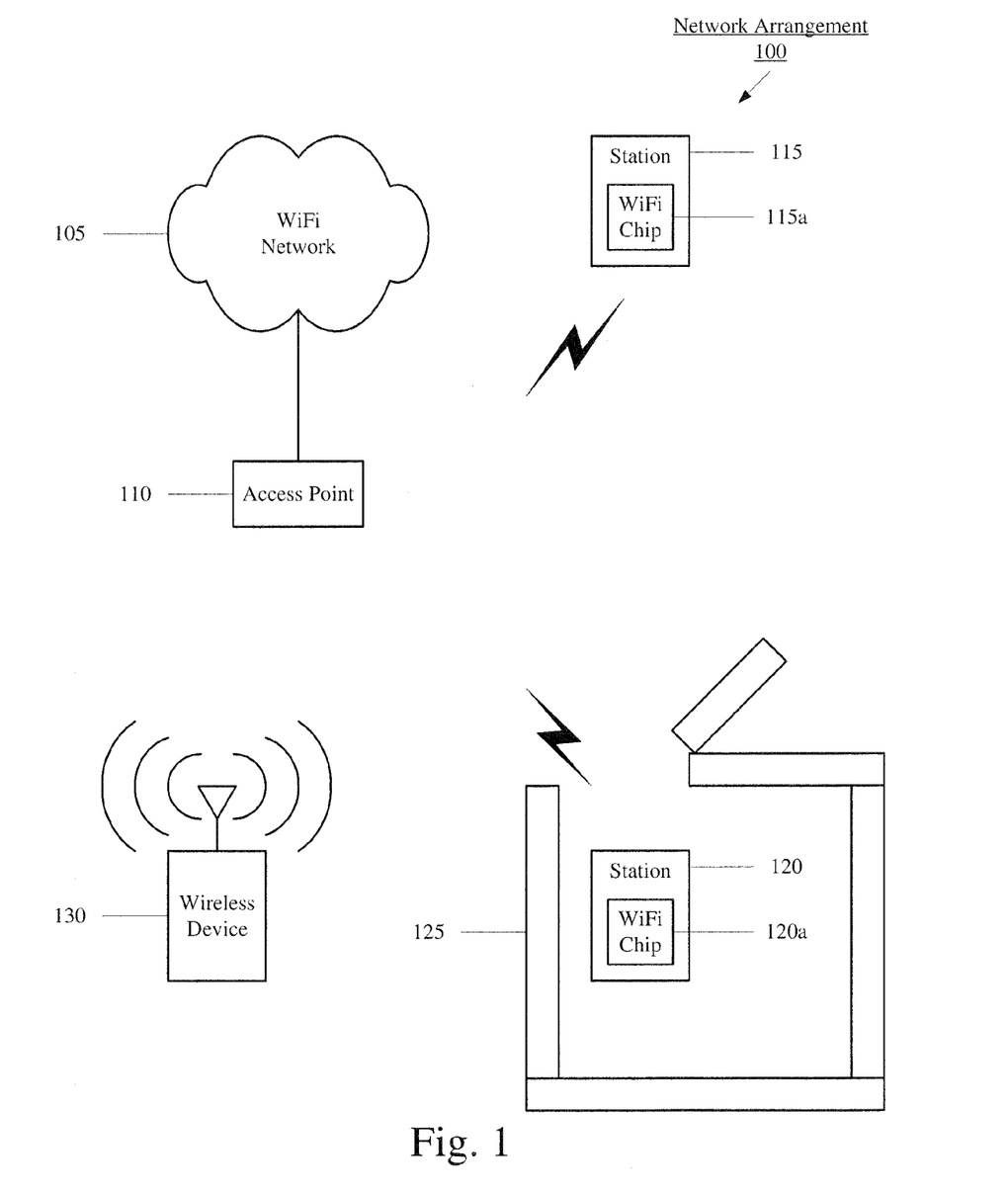
FIG. 1 shows an exemplary network arrangement for which a reliable WiFi data connectivity is provided to a station.

FIG. 1 shows an exemplary network arrangement 100 for which a reliable WiFi data connectivity is provided to a station 115 and/or a station 120. Specifically, the station 115 and the station 120 may connect to the WiFi network 105 via an access point 110. The WiFi network 105 may use any standard of WiFi, for example, those defined under IEEE 802.11 a/b/g/n/ac. The WiFi network 105 may also operate in any frequency range such as 2.4 GHz and 5 GHz. The WiFi network 105 may further represent any type of WiFi network such as a personal WiFi network, a home WiFi network, an enterprise WiFi network, a HotSpot, etc. In some cases, WiFi networks may be referred to as Wireless local area networks (WLANs). The WiFi network 105 may also include any network that is referred to as a WLAN. In addition, it is noted that the exemplary embodiments are not limited to WiFi networks, but may be implemented for any network where a physical layer rate may be selected in accordance with the principles described herein.

The stations 115, 120 may connect to the WiFi network 105 by associating with the access point 110. The station 115 may include a WiFi chip 115a and the station 120 may include a WiFi chip 120a such that signals may be transmitted and/or received at the operating frequency of the WiFi network 105. Accordingly, the stations 115, 120 may include an antenna or antenna arrangement that propagates signals generated by the WiFi chips 115a, 120a. It should be noted that the WiFi chips 115a, 120a may represent any transceiver component, a transmitter/receiver arrangement, etc. For example, the station 115 may include a transceiver that includes the WiFi chip 115a. The transceiver may also include further chips or other components such as a cellular chip (not shown) so that further frequency ranges may be used for wireless communications (e.g., cellular chipsets, Bluetooth chip, etc.).

Figure 2:
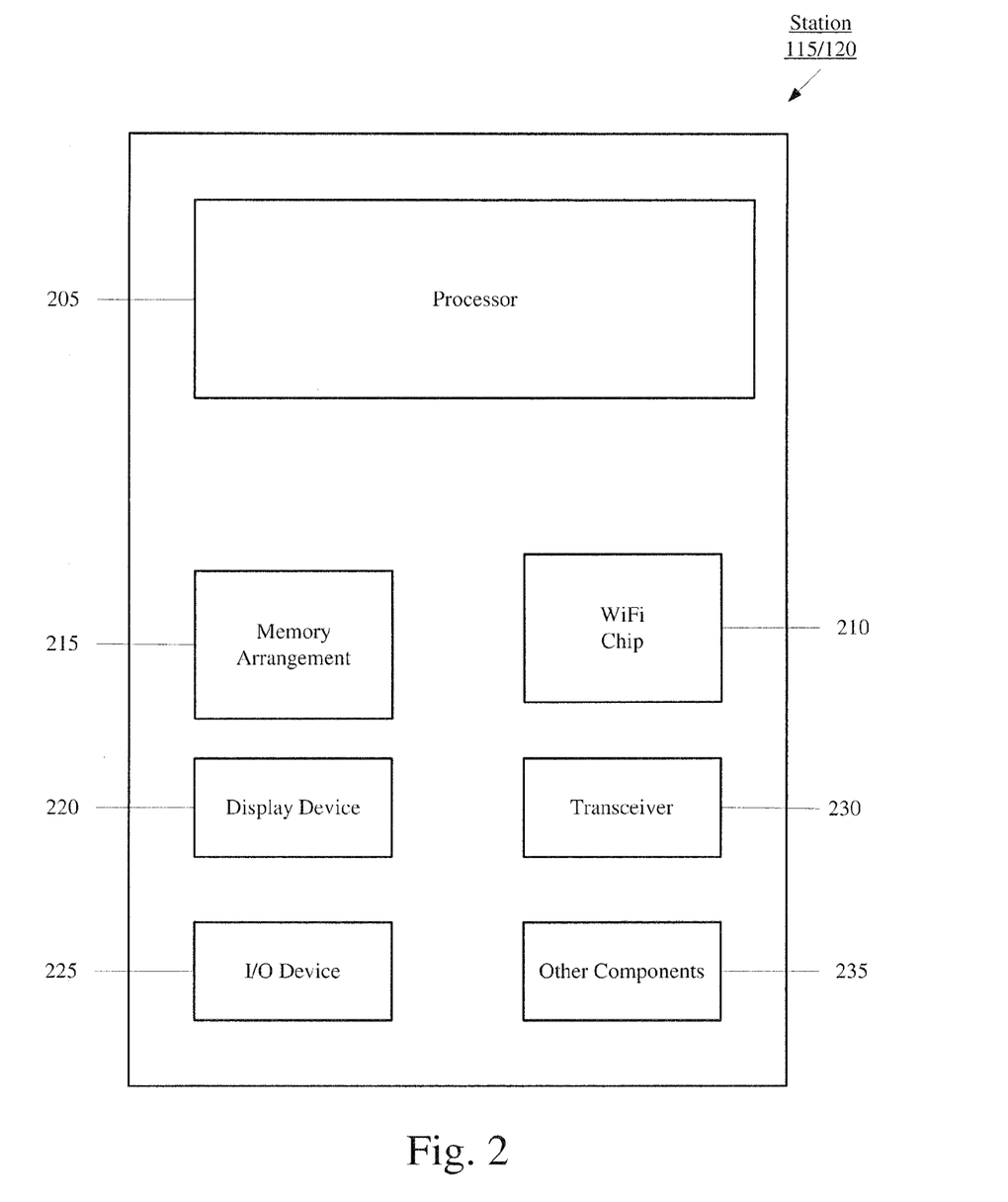
FIG. 2 shows components of an exemplary station configured to provide reliable WiFi data connectivity.

FIG. 2 shows a more detailed view of components of the stations 115, 120 that are configured to provide reliable WiFi data connectivity. The stations 115, 120 may represent any electronic device configured to connect to the WiFi network 105 using wireless means. For example, the station 115 may be a portable device (e.g., a cellular phone, a smartphone, a tablet, a phablet, a laptop, a wearable, etc.) or a stationary device (e.g., desktop terminal). The stations 115, 120 may include a processor 205, a the WiFi chip 210, a memory arrangement 215, a display device 220, an input/output (I/O) device 225, a transceiver 230, and other components 235 such as a portable power supply, an audio I/O device, etc.

The processor 205 may be configured to execute a plurality of applications of the stations 115, 120. For example, the applications may include a web browser when connected to the WiFi network 105. Similarly, the processor 205, in conjunction with the WiFi chip 210 and transceiver 230, may include an association application that establishes a connection between the WiFi network 105 and the stations 115, 120.

As will be described in further detail below, the WiFi chips 115a, 120a, 210 are described as performing the various functionalities of the exemplary embodiments. However, this is for illustrative purposes only. Those skilled in the art will understand that the processor 205 of the stations 115, 120 may execute a corresponding application to transmit signals that may cause the WiFi chips 115a, 120a to operate as described; the memory arrangement 215 of the stations 115, 120 may store various data related to the above listed applications; etc. In addition, in some stations, the functionality described for the processor 205 is split among two processors, a baseband processor and an applications processor. The exemplary embodiments may be implemented in any of these or other configurations of the station.

Referring back to FIG. 1, the access point 110 may represent any wireless access point for the WiFi network 105 that enables the stations 115, 120 to join the WiFi network 105. As discussed above, the WiFi network 105 may operate under various standards defined by IEEE. The standards may enable a plurality of physical layer rates for data connectivity between the WiFi network 105 and the stations 115, 120. The physical layer rates may refer to a physical layer (PHY) of the stations 115, 120. Specifically, the PHY may be a first conceptual layer of the Open Systems Interconnection (OSI) model, which defines internal functionalities of a communication system. The PHY being the first layer relates to a transmission technology of the WiFi network 105. The PHY may define the means of transmitting raw bits over a physical link connecting network nodes such as the access point 110 and the stations 115, 120. Thus, the PHY of the stations 115, 120 may translate logical communications requests from higher layers of the OSI model to transmit and receive signals with the WiFi network 105.

The access point 110 may define a plurality of physical layer rates that may be used by the stations 115, 120. For example, the access point 110 may be configured with one primary rate and at least one fallback rate. The physical layer rates may be provided to the stations 115, 120 from the access point 110, for example, when the stations associate with the access point. The primary rate may be an initial rate at which the stations 115, 120 may exchange transmissions with the access point 110. The primary rate may also be a highest rate at which this exchange of transmissions may be performed. As described above, the speeds at which the transmissions are performed typically have the highest preference. Thus, the primary rate may provide this highest available speed for the access point 110. The fallback rates may provide an increasingly robust physical layer rate. For the purposes of this description, it may be considered that "robust" refers to a quality of the connection between the stations 115, 120 and the access point 110. The quality may be considered the strength of the connection or the likelihood that the intended device is receiving signals that are being transmitted. Thus, a more robust physical layer rate may be considered a physical layer rate that results in a higher strength of received signals (e.g., higher received strength signal indication ("RSSI")) or less dropped packets between the connected devices. Those skilled in the art will understand that speed and robustness normally have an inverse relationship in which a slower speed provides a higher amount of robustness. For example, a first fallback rate that may be used with the access point 110 may have slower speed than the primary rate; a second fallback rate that may be used with the access point 110 may have a slower speed than the first fallback rate; etc.

Figure 3:
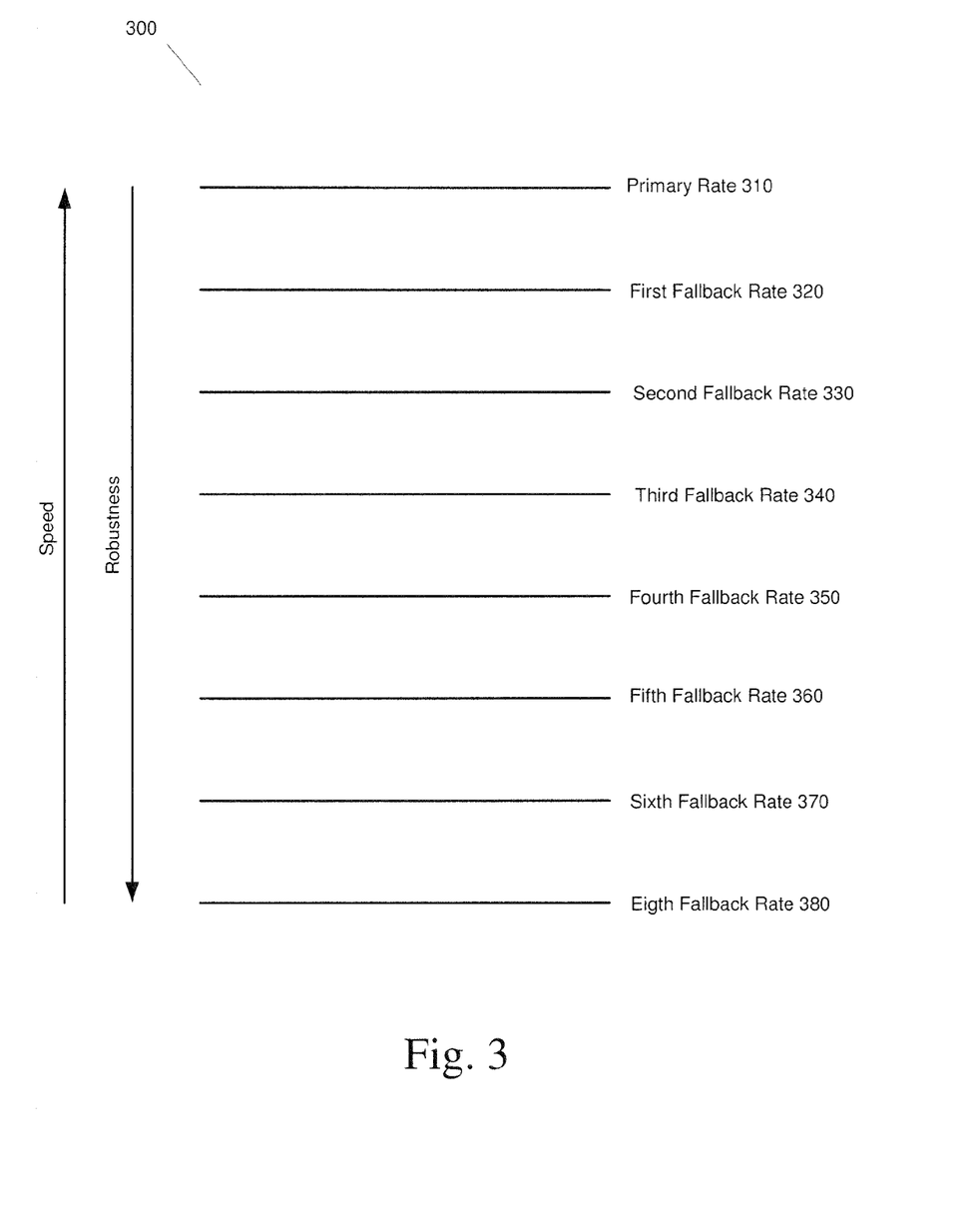
FIG. 3 shows an exemplary schematic diagram of physical layer rates that may be used by a station when connected to a WiFi network.

FIG. 3 shows an exemplary schematic diagram 300 of physical layer rates that may be used by a station when connected to a WiFi network. As shown by the vertical axis, the speed of the connection increases from bottom to top, while the robustness of the connection increases from the top to the bottom. In this example, there are eight (8) possible physical layer rates 310-380. However, this is only exemplary as a WiFi network may implement any number of physical layer rates. The actual speed associated with the physical layer rates 310-380 are not relevant for the description of the exemplary embodiments as the actual speed will normally depend on the WiFi standard and connection parameters that are being used in the WiFi network. However, to provide an example for context, it may be considered that the WiFi network 105 is an 802.11n type network that is operating at 5 GHz having a 40 MHz bandwidth. In this example, the throughput (speed) of the physical layer rates may be 150, 135, 120, 90, 60, 45, 30, 15 Mbit/second for the physical layer rates 310-380, respectively. Those skilled in the art will understand that the speeds provided above are only exemplary and other speeds may be used.

As described above, the primary rate 310 is the highest speed connection. Each of the fallback rates 320-380 has a lower speed and correspondingly a higher robustness than the previous fallback rate. In the IEEE 802.11n example provided above, the interval between each of the physical layer rates is not equal, e.g., the interval between the primary rate 310 (150 Mbit/sec) and the first fallback rate 320 (135 Mbit/sec) is 15 Mbit/sec, while the interval between the second fallback rate 330 (120 Mbit/sec) and the fourth fallback rate 340 (90 Mbit/sec) is 30 Mbit/sec. The exemplary embodiments do not require any specific interval between the different physical rates.

For purposes of determining a physical layer rate to be used by the stations 115, 120 for transmissions with the access point 110, the stations 115, 120 may perform a convergence process to determine a converged physical layer rate. The following provides a short description of an exemplary convergence process performed by the station 115. However, the station 120 may perform a substantially similar convergence process. The station 115 initially selects the primary rate 310 as the physical layer rate. The station 115 may then measure a parameter of the data exchanges between the station 115 and the access point 110 operating at the primary rate 315. Examples of monitored parameters may be a Packet Error Rate (PER), a Bit Error Rate (BER), etc. If the PER or BER using the primary rate is greater than a predetermined error threshold, then the station 115 may determine that the primary rate is insufficient (e.g., the PER or BER is too high for the connection to be considered reliable) given the current network conditions.

The station 115 may then select the first fallback rate 320. As discussed above, the first fallback rate 320 may provide a lower speed of transmission, but this lower speed may result in a corresponding increase in robustness and probability that the station 115 properly receives data packets. The data transmissions using this first fallback rate 320 may continue in a substantially similar manner as the primary rate 310 transmissions discussed above. Subsequently, another PER or BER analysis is performed to determine whether the first fallback rate 320 is an acceptable speed for the station 115. This process may continue through additional fallback rates 330-380 until a physical layer rate is identified that satisfies the error threshold, e.g., the converged physical layer rate. It should be noted that once the station 115 identifies an acceptable fallback rate 320-380, the station 115 may perform a similar finer granularity convergence process between the acceptable fallback rate and the previous unacceptable fallback rate.

The convergence process discussed above may provide various advantages for WiFi data connectivity of the station 115 with the access point 105. However, the convergence process may also include various drawbacks. In a first example, identifying the converged physical layer rate satisfying the error threshold may require a considerable amount of time. In a second example, the convergence process requires a sufficient number of data packets to be processed. For a typical browsing application being used by the station 115 with the WiFi data connectivity, the number of frames may be just 10's of frames per second, which leads to an insufficient sample space to converge. In a third example, channel characteristics and/or signal quality may worsen during the converging time. This may also result in rates being converged prematurely and not satisfy the various thresholds under the changed network conditions.

The above limitations may be more severe for stations that are mobile due to various factors including the mobility, aggressive power saving schemes, etc. For example, the mobility of the stations may result in the above discussed network changes during the convergence process. In another example, the aggressive power saving scheme may cause long periods of inactivity followed by instantaneous switch to periods with a huge traffic burst.

FIG. 1 further shows examples that may cause deteriorated wireless channel conditions. In a first example, the station 115 may have established a converged physical layer rate with the access point 110 using the above described convergence process. However, during use, the station 115 may move locations. For example, the station 115 may move into a room. The station 120 illustrates such a scenario. The room may include structures 125 that may impede use of the converged physical layer rate. For example, the RSSI value with the access point 110 may be lower due to interference from the structures 125. Although a clear line of sight may still be established, the structures 125 may include walls and a door that may be closed to eliminate this line of sight. The RSSI value may thus be significantly lower than under previous conditions and the converged physical rate determined in the convergence process may not be sufficient for a reliable connection.

When the network conditions change, the station 115 may again use the convergence process to determine a new converged physical layer rate to use under these new network conditions. However, when the station 115 experiences deteriorated wireless channel conditions, the station 115 may experience undue data loss from the time needed to finally arrive at an acceptable physical layer rate. The exemplary embodiments provide a mechanism to maintain a reliable WiFi data connectivity by the station 115 to the WiFi network 105 when deteriorated wireless channel conditions are determined. Specifically, the station 115 may utilize a robustness criteria over a speed criteria.

According to the exemplary embodiments, the station 115 may use a robust fallback rate (e.g., seventh fallback rate 380) when the channel conditions and/or signal quality are determined to be changed from the time the station 115 has previously determined a converged physical layer rate. Using a robust fallback rate may increase the probability that the WiFi data connectivity is reliable for the station 115 as there is a lesser likelihood of data loss. Switching to the robust fallback rate instantaneously based upon the deteriorated wireless channel conditions may enable the station 115 to react quickly enough to the updated channel conditions with little to no data loss. In the exemplary embodiments, the robust fallback rate will be considered to be the fallback rate having the lowest speed among the available fallback rates (e.g., seventh fallback rate 380). However, it should be understood that a different fallback rate may be used as the robust fallback rate. For example, a user or system administrator may set the fifth fallback rate 360 as the robust fallback rate for the station 115.

Subsequently, a second convergence process may be performed that is substantially opposite to the above-described convergence process. That is, the above-described convergence process uses the primary rate 310 initially and sequentially uses the fallback rates 320-380 in order from highest speed to lowest speed. In contrast, the second convergence process starts by selecting the robust fallback rate (e.g., seventh fallback rate 380) and sequentially using the rates 370-310 in order from lowest speed to highest speed. Those skilled in the art will appreciate that the second convergence process maintains the reliability of the WiFi data connectivity since the robustness is substantially maintained during the convergence process such that any data loss is minimized. For this reason, the second converging process may be termed a "reliability convergence process" in this description.

The deteriorated wireless channel conditions that trigger the reliability convergence process according to the exemplary embodiments may include a variety of factors such as those discussed above. For example, the deteriorated wireless channel conditions may be determined by a drop in the RSSI of the access point since the last time the converged rate succeeded over the air (e.g., an acknowledgement was received for a transmission and then the station detected the drop in the RSSI). In another example, the deteriorated wireless channel conditions may be determined based on the expiration of a time interval since the station previously exchanged data with the access point. When the station determines these deteriorated wireless channel conditions, the station will switch to the robust fallback rate to immediately eliminate data loss. However, after selecting the robust fallback rate, the station will perform the reliability convergence process to select a new converged rate.

Figure 4:
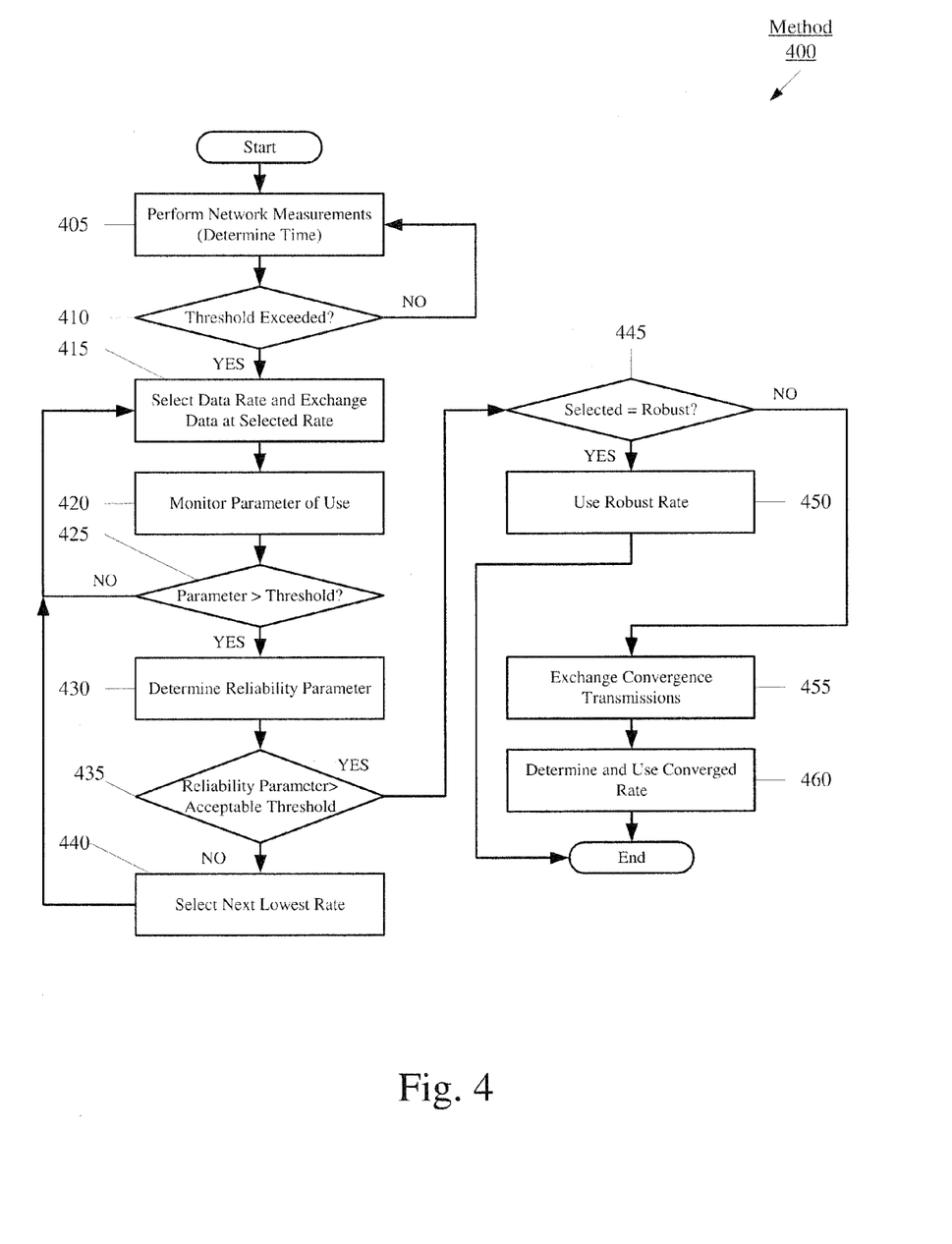
FIG. 4 shows an exemplary method for providing reliable WiFi data connectivity.

FIG. 4 shows an exemplary method 400 for providing reliable WiFi data connectivity. The method 400 relates to performing the reliability convergence process when a change in network conditions is detected or a time period has lapsed. The method 400 will be described with regard to the station 115. However, it should again be noted that the station 120 may also perform the method 400. The method 400 will be described with regard to the network arrangement 100 of FIG. 1 and the physical layer rates 310-380 of FIG. 3. It may be considered that the station 115 has performed the first convergence process described above and has found the converged rate for exchanges with the access point 110 and has stored either the network conditions and/or the time when this converged rate has been selected.

In 405, the station 115 performs measurements for network operating parameters and/or determines a current time. Throughout the remainder of the description of the method 400 it will be considered that the station 115 is performing both measurements (e.g., network operating parameters and time). However, it is not required that the station perform and use both measurements. The method 400 may be performed when only one of the measurements (e.g., network operating parameters and time) is performed.

In 410, the station 115 determines whether a change in the network operating parameters or an amount of time has exceeded a predetermined threshold since the converged rate has been selected. The timing threshold may be a maximum amount of time that the converged rate is to be used regardless of whether a network change has occurred. The amount of time may be determined based upon the time stored when the converged physical layer rate that is currently being used was determined using the first convergence process. The network operating parameter change threshold may be based on a comparison of current network operating parameters to the network operating parameters that are stored from when the converged physical layer rate was determined. The network operating parameter may be, for example, a RSSI determined from data exchanges with the access point 110. The threshold may be a predetermined delta value from the stored network operating parameters (e.g., a 10-20% change).

If the network operating parameter change or the timing threshold is not exceeded, the station 115 returns the method 400 to 405. However, if either threshold is exceeded, the method 400 may continue to 415 where the station 115 selects the robust fallback rate (e.g., seventh fallback rate 380).

In 420, the station 115 monitors a parameter of use for the transmissions and in 425; the station 115 determines whether this monitored parameter has exceeded a threshold. In one exemplary embodiment, the parameter of use may be time. However, other parameters may be selected such as a number of packets that have been exchanged, etc. The monitoring could include more than one parameter. The reason for monitoring this parameter of use is that the station 115 will later determine a reliability parameter (in 430) for the data transmission. The parameter of use is monitored to ensure that the station 115 has enough sampling data to determine the reliability parameter. For example, if the parameter of use is time, the station 115 will assume that enough data traffic has occurred in the determined time period to accurately determine the reliability parameter. If the parameter of use is amount of traffic (e.g., measured as data packets exchanged), the station 115 will assume that after meeting the threshold of traffic, the station may accurately determine the reliability parameter.

In 425, the station 115 determines whether this monitored parameter has exceeded a threshold. The exceeding of the threshold may be referred to as the occurrence of an event. As described above, the threshold could be a predetermined period of time or a predetermined number of packets or a combination thereof. For example, the threshold could be a dual threshold based on a number of parameters (e.g., the threshold is X number of packets or Y amount of time, whichever occurs first). If the parameter of use has not exceeded the threshold, the station 115 returns the method 400 to 415 and continues to use the robust rate (415) and monitor the parameter of use (420).

If the parameter exceeds the threshold, the station 115 continues the method 400 to 430. In 430, the station 115 determines a reliability parameter (e.g., PER, BER or any other reliability parameter) for data transmissions that are received from the access point 110 during the time of using the robust rate. In 435, the station 115 determines whether the reliability parameter exceeds an acceptable error threshold. It should be understood that in this context, the acceptable error threshold refers to a value where being above the acceptable error threshold indicates that the connection operating at the current rate has an unacceptably high error rate. Conversely, being below the acceptable error threshold indicates that the connection operating at the current rate is acceptable.

If the reliability parameter exceeds the acceptable error threshold in 435, the method 400 continues to 445 where the station 115 determines whether the selected rate is the robust fallback rate. Since, in this example, the selected rate is the robust fallback rate (e.g., seventh fallback rate 380, the station 115 continues the method 400 to 450 in which the robust fallback rate is used. It should be understood that the exceeding of the acceptable error threshold indicates that even the robust fallback rate is not particularly good, but since it is the lowest rate used by the access point 110, the station 115 will continue to use this fallback rate.

Returning to 435, if the reliability parameter does not exceed the acceptable error threshold, the station 115 continues the method 400 to 440 where the station 115 selects the next lowest rate, e.g., the sixth fallback rate 370. The station 115 returns the method 400 to 415. It should be understood that since the robust fallback rate does not exceed the acceptable error threshold, it may be possible to increase the rate from the robust fallback rate and maintain the required robustness.

In 415, the station 115 performs data transmissions using the newly selected fallback rate (e.g., the sixth fallback rate 370). In 420, the station 115 monitors the parameter of use for the sixth fallback rate 370. In 425, the station 115 determines whether the parameter of use for the sixth fallback rate 370 exceeds the threshold. If the threshold is exceeded, in 430, the station 115 determines the reliability parameter for the data transmissions using the sixth fallback rate 370. In 435, the station 115 determines whether the reliability parameter exceeds the acceptable error threshold. If the reliability parameter exceeds the acceptable error threshold, in 445, the station 115 determines whether the selected rate is the robust rate. Since the sixth fallback rate 370 is not the robust rate in this example, the station 115 continues the method 400 to 455.

In 455, the station 115 performs convergence transmissions that may be more finely granular changes to the data rate between an acceptable rate and an unacceptable rate (e.g., the sixth fallback rate 370 and the seventh fallback rate 380 in this example). The result of the convergence transmissions is that in 460, a converged physical layer rate may be determined and used. In this example, the converged rate will be a rate between the robust seventh fallback rate 380 and the sixth fallback rate 370.

If the reliability parameter does not exceed the acceptable error threshold, in 440, the station 115 selects the next lowest rate, e.g., the fifth fallback rate 360. The station 115 may repeat s 415-460 until a further converged physical layer rate has been determined.

The exemplary embodiments provide a station and method for providing reliable WiFi data connectivity between a station and an access point of a WiFi network. The exemplary embodiments provide a mechanism of using a robust fallback rate among the available rates for use with the access point by the station. Upon detection of a trigger, the station may select and use the robust fallback rate. Subsequently, a convergence process may be used to determine a physical layer rate to be used by the station with the access point that provides a higher speed than the robust fallback rate. Specifically, the convergence process uses a next lowest speed fallback rate among the remaining fallback rates until a criteria is no longer satisfied.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile hardware device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method comprising:
   at a station:
   determining a first physical layer rate to perform data transmissions between the station and an access point of a WiFi network, the first physical layer rate being based on a primary rate and a plurality of fallback rates associated with the access point, wherein;
   the primary rate has a higher transmission speed than the plurality of fallback rates; and
   the plurality of fallback rates includes N fallback rates, wherein an Nth one of the fallback rates has a lowest speed among the N fallback rates;
   determining a trigger based upon a comparison of at least one current condition of the station and at least one corresponding prior condition that existed at a time when the first physical layer rate is determined;
   after occurrence of the trigger and prior to performing a measurement on the Nth fallback rate, selecting the Nth fallback rate; and
   performing data transmissions between the station and the access point using the Nth fallback rate.

2. The method of claim 1, wherein a first one of the fallback rates has a highest speed among the N fallback rates.

3. The method of claim 1, further comprising:
   determining a first reliability measurement for the data transmissions at the Nth fallback rate; and
   selecting a further one of the plurality of fallback rates having a next lowest transmission speed based on the first reliability measurement.

4. The method of claim 3, wherein the first reliability measurement is one of a packet error rate or a bit error rate of the transmissions.

5. The method of claim 3, wherein a parameter of use is measured for the data transmissions at the Nth fallback rate and wherein the first reliability measurement is determined after a threshold of the parameter of use is satisfied.

6. The method of claim 5, wherein the parameter of use is one of an amount of time elapsed since selecting the Nth fallback rate or an amount of data packets exchanged between the station and the access point at the Nth fallback rate.

7. The method of claim 3, further comprising:
   performing data transmissions with the access point at the further one of the plurality of fallback rates;
   determining a second reliability measurement for the data transmissions at the further one of the plurality of fallback rates; and
   calculating a second physical layer rate from a convergence between the Nth fallback rate and the further one of the plurality of fallback rates.

8. The method of claim 1, further comprising:
   storing the at least one corresponding prior condition.

9. The method of claim 1, wherein the current condition and the corresponding prior condition correspond to one of a change in a network condition experienced by the station or an amount time that has passed from the first physical layer rate being determined.

10. The method of claim 6, wherein the threshold comprises a dual threshold based at least in part on a plurality of parameters of use, wherein the dual threshold is satisfied after one of the plurality of parameters of use is satisfied.

11. The method of claim 1, wherein a user or system administrator can preselect the data rate for the Nth fallback rate.

12. A station, comprising:
a transceiver configured to establish a connection to a network; and
a processor,
wherein the processor and transceiver are configured to determine a physical layer rate to be used with an access point of the network by:
   determining a first physical layer rate to perform data transmissions between the station and an access point of a WiFi network, the first physical layer rate being based on a primary rate and a plurality of fallback rates associated with the access point, wherein:
      the primary rate has a higher transmission speed than the plurality of fallback rates; and
      the plurality of fallback rates includes N fallback rates, wherein an Nth one of the fallback rates has a lowest speed among the N fallback rates;
   determining a trigger based upon a comparison of at least one current condition of the station and at least one corresponding prior condition that existed at a time when the first physical layer rate is determined;
   after occurrence of the trigger and prior to performing a measurement on the Nth fallback rate, selecting the Nth fallback rate; and
   performing data transmissions between the station and the access point using the Nth fallback rate.

13. The station of claim 12, wherein a first one of the fallback rates has a highest speed among the N fallback rates.

14. The station of claim 12, wherein the physical layer rate is further determined by:
   determining a first reliability measurement for the data transmissions at the Nth fallback rate; and
   selecting a further one of the plurality of fallback rates having a next lowest transmission speed based on the first reliability measurement.

15. The station of claim 14, wherein the first reliability measurement is one of a packet error rate or a bit error rate of the transmissions.

16. The station of claim 14, wherein a parameter of use is measured for the data transmissions at the Nth fallback rate and wherein the first reliability measurement is determined after a threshold of the parameter of use is satisfied.

17. The station of claim 16, wherein the parameter of use is one of an amount of time elapsed since selecting the Nth fallback rate or an amount of data packets exchanged between the station and the access point at the Nth fallback rate.

18. The station of claim 14, wherein the physical layer rate is further determined by:
   performing data transmissions with the access point at the further one of the plurality of fallback rates;
   determining a second reliability measurement for the data transmissions at the further one of the plurality of fallback rates; and
   calculating the second physical layer rate from a convergence between the Nth fallback rate and the further one of the plurality of fallback rates.

19. The station of claim 12, further comprising:
   a memory arrangement that stores the at least one corresponding prior condition and wherein the current condition and the corresponding prior condition correspond to one of a change in a network condition experienced by the station or an amount time that has passed from the first physical layer rate being determined.

20. A non-transitory computer readable storage medium with an executable program stored thereon, wherein the program instructs a microprocessor to perform operations comprising:
   determining a first physical layer rate to perform data transmissions between a station and an access point of a network, the first physical layer rate being based on a primary rate and a plurality of fallback rates associated with the access point, wherein;
      the primary rate has a higher transmission speed than the plurality of fallback rates; and
      the plurality of fallback rates includes N fallback rates, wherein an Nth one of the fallback rates has a lowest speed among the N fallback rates;
   determining a trigger based upon a comparison of at least one current condition of the station and at least one corresponding prior condition that existed at a time when the first physical layer rate is determined;
   after occurrence of the trigger and prior to performing a measurement on the Nth fallback rate, selecting the Nth fallback rate; and
   performing data transmissions between the station and the access point using the Nth fallback rate.

* * * * *

UNITED STATES PATENT AND TRADEMARK OFFICE
CERTIFICATE OF CORRECTION

PATENT NO. : 10,187,824 B2
APPLICATION NO. : 14/726121
DATED : January 22, 2019
INVENTOR(S) : Chaitanya Mannemala and Kapil Chhabra

Page 1 of 1

It is certified that error appears in the above-identified patent and that said Letters Patent is hereby corrected as shown below:

In the Claims

Column (12), Line 20:
"or an amount time" should be "or an amount of time"

Signed and Sealed this
Twenty-first Day of April, 2020

Andrei Iancu
*Director of the United States Patent and Trademark Office*